United States Patent [19]

Choi

[11] Patent Number: 5,717,375

[45] Date of Patent: Feb. 10, 1998

[54] DEVICE FOR ALARMING A CAR THAT HAS ALREADY BEEN STARTED

[75] Inventor: Hee Woo Choi, Puchon, Rep. of Korea

[73] Assignee: Kia Motors Corporation, Seoul, Rep. of Korea

[21] Appl. No.: 715,535

[22] Filed: Sep. 18, 1996

[30] Foreign Application Priority Data

Aug. 22, 1996 [KR] Rep. of Korea ............ 1996-34810

[51] Int. Cl.$^6$ .................................................. B60Q 1/00
[52] U.S. Cl. .................. 340/438; 340/457; 340/460; 180/271; 290/38 C; 307/10.6
[58] Field of Search .................. 340/425.5, 457, 340/686, 438, 460, 428, 426; 123/179.2, 179.3, 179.4; 180/271, 272; 307/10.3, 10.6; 290/37 A, 37 R, 38 C, 38 R; 70/252

[56] References Cited

U.S. PATENT DOCUMENTS 3,947,812  3/1976  Lee et al. ................. 340/457
4,426,691  1/1984  Kawasaki ................. 340/460

*Primary Examiner*—Jeffery Hofsass
*Assistant Examiner*—Daniel J. Wu

[57] ABSTRACT

A device for alarming a car that has already been started, which is capable of audibly informing of starting of the car so as to prevent the starting system of the car from being driven in a state that the engine has started. The device includes a starting sensing unit for sensing whether or not an engine of the car has started, a key position sensing unit for sensing the current switch position of a starting key, an audio converter for generating an audio signal in accordance with an output signal from the key position sensing unit, and a speaker for outputting the audio signal so as to audibly inform of a starting state of the engine. The key position sensing unit has a comparator adapted to compare the output signal from the key position sensing means with a reference value, thereby determining whether or not the engine has started and sends the resultant signal from the comparator to the audio converter.

2 Claims, 4 Drawing Sheets

DEVICE FOR ALARMING A CAR THAT HAS ALREADY BEEN STARTED

BACKGROUND OF THE INVENTION

1. Field of the Invention

The present invention relates to a device for alarming starting of a car, and more particularly to a device for audibly informing of starting of a car made in a starting state or stopped state of the engine of the car, thereby being capable of preventing the starting system of the car from being overloaded.

2. Description of the Prior Art

Generally, the engine of a car operates in a four-stroke cycle including suction, compression, explosion, and exhaust strokes. Among these strokes, only the explosion stroke can generate energy. The energy generated in the explosion stroke is accumulated in a fly wheel so as to achieve a continued driving of the engine.

In order to start the engine, a force required for initial suction and compression strokes should be externally provided. That is, a starting system is used to provide an external force for rotating the engine so that the engine can start.

Typically, such a starting system includes a DC motor (starting motor) supplied with electric power from a battery, and a power transmission mechanism for transmitting a rotating force from the DC motor to the engine. The DC motor is turned on by a switching operation of a key switch which is disposed in the interior of the car.

Typically, the key switch has several switch positions as shown in FIG. 1. That is, the key switch has an OFF position, an ACC position at which the electric power from the battery can be applied to an audio appliance and lamps, an ON position at which the electric power can be applied to wipers and other electric appliances equipped in the car, and a START position at which the starting motor can be turned on. When the key switch is switched to its ON position and then to its START position by rotating a key inserted into a key hole operatively connected to the key switch, the starting motor is turned on, thereby starting the engine. When the rotating force applied to the key is released after starting the engine, the key rotates reversely, thereby causing the key switch to be switched to its ON position.

In such a switching construction, it is impossible to confirm whether or not the engine of the car has started. For this reason, the stating motor re-turns on frequently in the start state of the engine. In this case, the starting motor and speed change device may be overloaded, thereby resulting in a reduction in the life of associated elements. As a result, the reliability of the car may be degraded.

SUMMARY OF THE INVENTION

Therefore, an object of the invention is to solve the above-mentioned problem involved in the prior art and to provide a device for alarming starting of a car, which is capable of audibly informing of starting of the car so as to prevent the starting system of the car from being driven in a state that the engine has started, thereby protecting elements of the starting system.

In accordance with the present invention, this object is accomplished through a device for alarming staring of a car, comprising: starting sensing means for sensing whether or not an engine of the car has started; key position sensing means for sensing the current switch position of a starting key; an audio converter for generating an audio signal in accordance with an output signal from the key position sensing unit; and a speaker for outputting the audio signal so as to audibly inform of a starting state of the engine.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
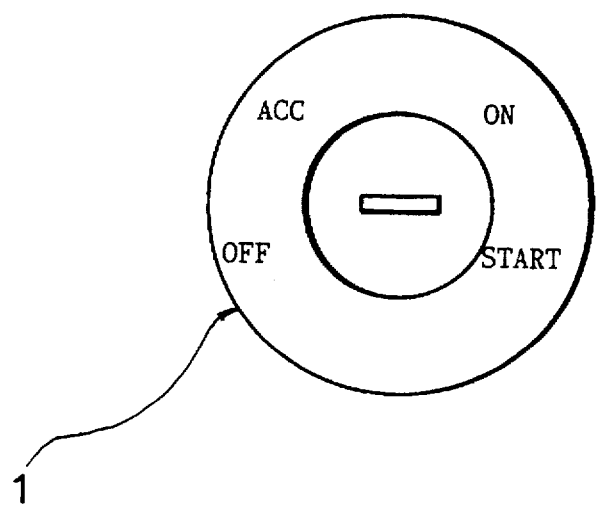
FIG. 1 is a schematic view illustrating a general key switch equipped in a car.
Figure 2:
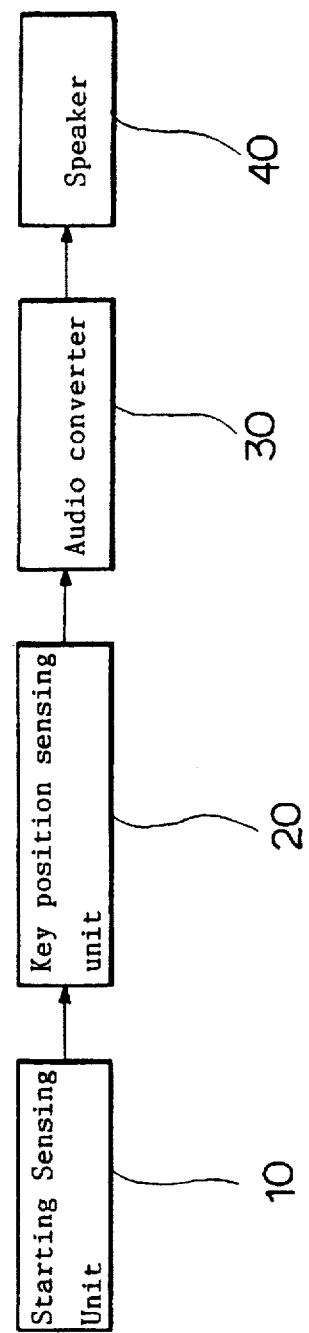
FIG. 2 is a block diagram illustrating a device for alarming starting of a car in accordance with the present invention.
Figure 3:
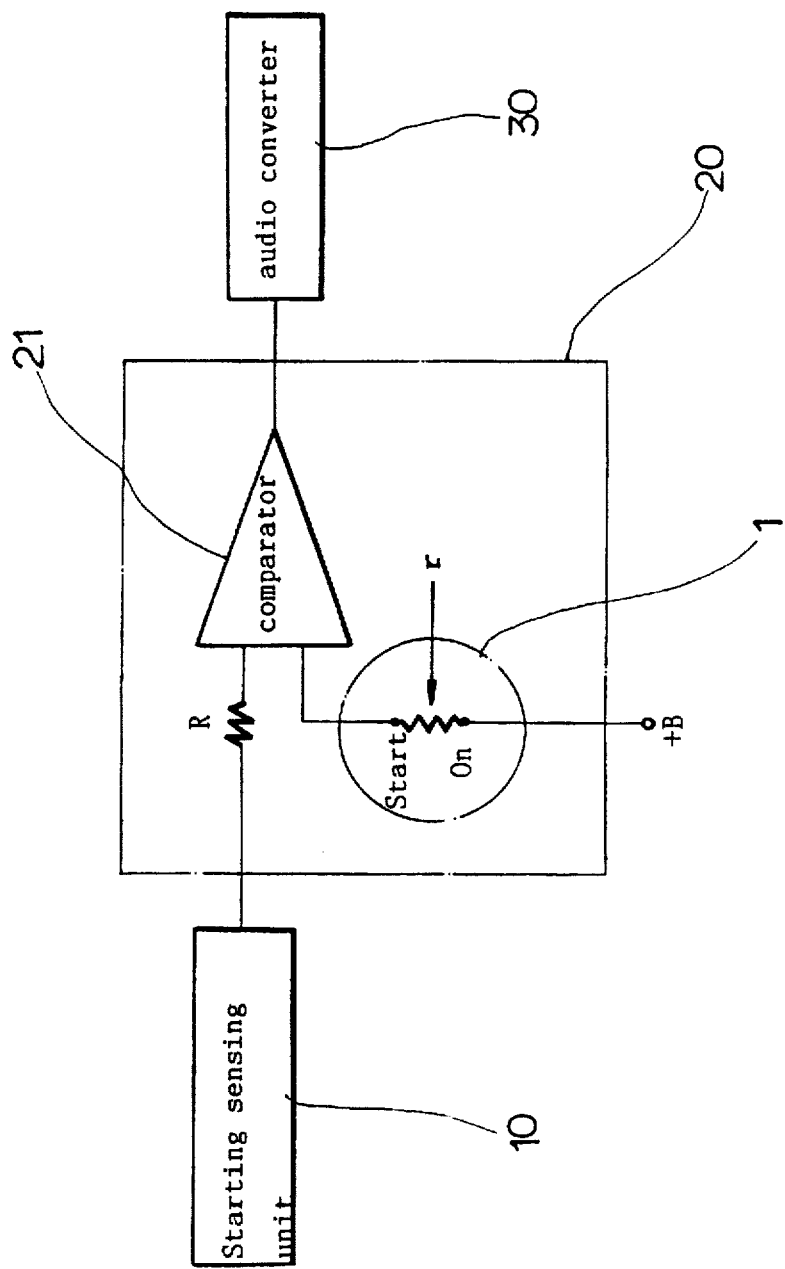
FIG. 3 is a block diagram illustrating a key position sensing unit included in the device of the present invention.

FIG. 2 illustrates a device for alarming staring of a car in accordance with the present invention. As shown in FIG. 2, the device includes a starting sensing unit 10 for sensing whether or not the engine of the car has started, a key position sensing unit 20 for sensing position of a starting key, an audio converter 30 for generating an audio signal in accordance with an output signal from the key position sensing unit and a speaker 40 for outputting an audio signal indicative of the starting state of the engine.

The key position sensing unit 20 includes a comparator 21 coupled at one input thereof to the starting sensing unit 10 via a resistor R and at the other input thereof to a key switch 1 provided with a resistor. The key position sensing unit 20 compares a measured resistance value with a resistance value between the ON and start positions of the key switch 1, namely, a reference value. The resultant signal from the key position sensing unit 20 is sent to the audio converter 30. Accordingly, an audio signal indicative of the current state of the engine is output through the speaker 40.

Figure 4:
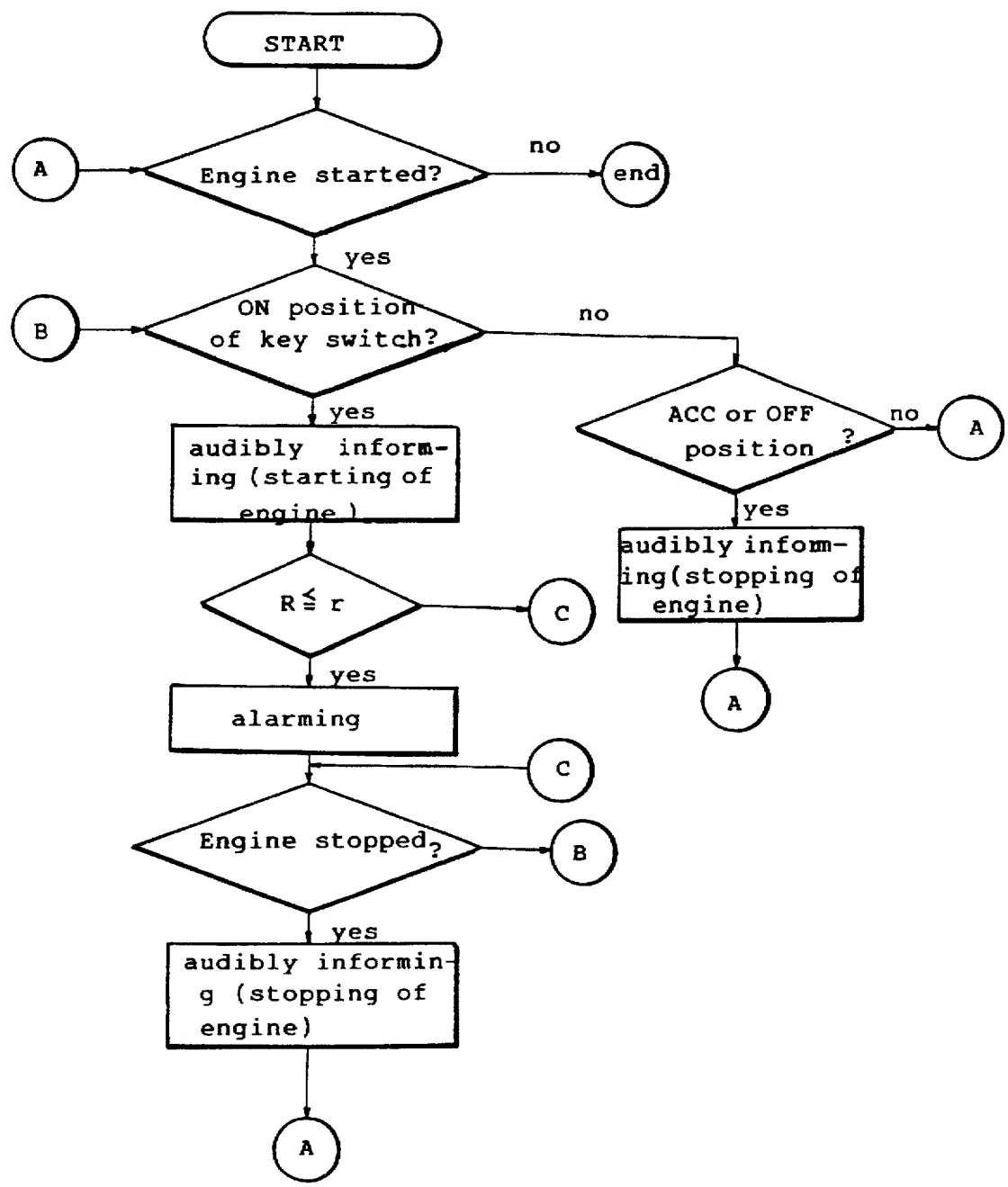
FIG. 4 is a flow chart illustrating the operation of the device according to the present invention.

FIG. 4 is a flow chart illustrating the operation of the above-mentioned device according to the present invention. Once the key is manipulated to start the engine, it is checked whether or not the engine has started. Where the engine has started, the current switch position of the key switch is detected. When the current switch position of the key switch corresponds to the ON position, it is audibly informed that the engine has started is generated. On the other hand, where the current switch position of the key switch does not correspond to the ON state, it is audibly informed that the engine is stopped.

Thereafter, it is determined whether the measured resistance value r is higher than the reference value, namely, the resistance value R between the ON and START positions of the key switch 1. When it is attempted to start the engine again in the state that the engine has started, the measured resistance value r is higher than the reference value R. In this case, it is audibly informed that the engine has already started. When the engine is stopped after completing running of the car, it is alarmed that the engine is stopped.

As apparent from the above description, the present invention provides a device for alarming starting of a car, which is capable of audibly informing of starting of the car so as to prevent the starting system of the car from being driven in a state that the engine has started. In accordance with the device of the present invention, the driver can be given an alarm indicative of the fact that the engine has started. Accordingly, it is possible to protect elements of the starting system including the starting motor, thereby lengthening the life of those elements.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A device for alarming a car that has already been started, comprising:

starting sensing means for sensing whether or not an engine of the car has started;

key position sensing means for sensing the current switch position of a starting key;

an audio converter for generating an audio signal in accordance with an output signal from the key position sensing unit; and a speaker for outputting the audio signal so as to audibly inform of a starting state of the engine.

2. The device in accordance with claim 1, wherein the key position sensing means comprises a comparator adapted to compare the output signal from the key position sensing means with a reference value, thereby determining whether or not the engine has started and sends the resultant signal from the comparator to the audio converter.

* * * * *